J. E. BRANNON & P. MICHAEL.
FAUCET.
APPLICATION FILED JUNE 8, 1912.
1,059,824. Patented Apr. 22, 1913.
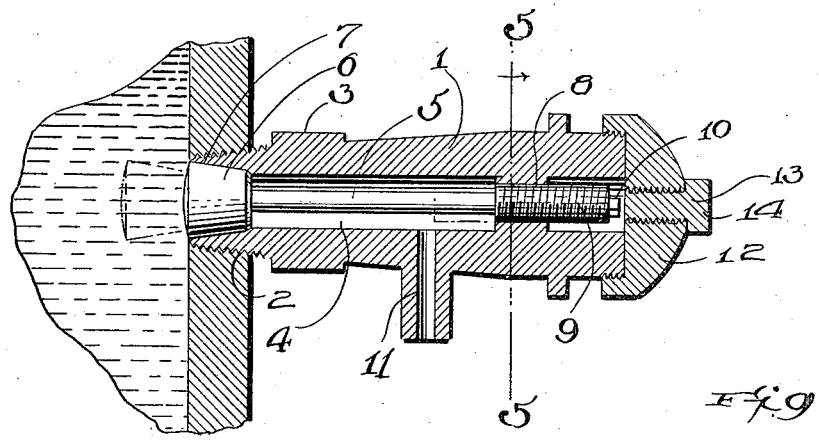
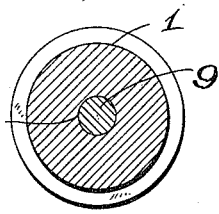
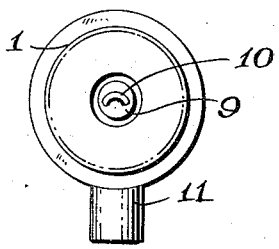 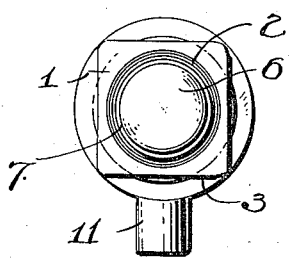
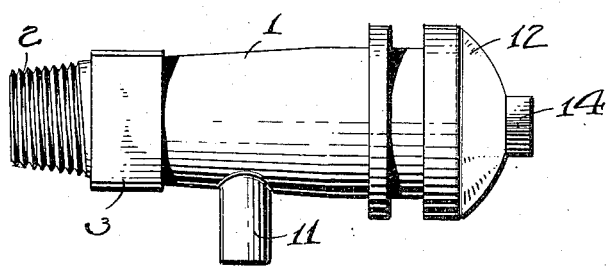
WITNESSES
INVENTORS
John E. Brannon
Pete Michael
By E. E. Vrooman,
their Attorney

UNITED STATES PATENT OFFICE.

JOHN EMRY BRANNON AND PETE MICHAEL, OF FONTANET, INDIANA.

FAUCET.

1,059,824.     Specification of Letters Patent.     Patented Apr. 22, 1913.

Application filed June 8, 1912. Serial No. 702,455.

*To all whom it may concern:*

Be it known that we, JOHN EMRY BRANNON and PETE MICHAEL, citizens of the United States, residing at Fontanet, in the county of Vigo and State of Indiana, have invented certain new and useful Improvements in Faucets, of which the following is a specification, reference being had therein to the accompanying drawing.

This invention relates to faucets and has for its object the production of an efficient means for preventing unauthorized access to the contents of a receptacle in connection with which it is used.

Another object of this invention is the production of a faucet having a minimum number of parts and for the purpose set forth.

With these and other objects in view this invention consists in certain novel combinations, constructions, and arrangement of parts as will be hereinafter fully described and claimed.

In the accompanying drawings:—Figure 1 is a central longitudinal section of the device showing the same as used in connection with a receptacle. Fig. 2 is a side elevation of the device. Fig. 3 is a view of the inner end thereof. Fig. 4 is a view of the key end with the sealing cap removed. Fig. 5 is a section taken on line 5—5, of Fig. 1, looking in the direction of the arrow.

This faucet is used in connection with kegs and barrels which contain different liquid contents and consists of a cylindrical body 1. This body 1 is provided on its inner end with the conical threaded portion 2, which allows the faucet to be threaded into a receptacle by means of a gripping tool used in connection with the square portion 3 formed near the conical end. The body 1 is provided with the tubular opening 4, said tubular opening extending entirely through the body portion. A plunger 5 is carried within said tubular opening 4 and is provided upon its inner end with the closure plug 6, which rests upon the valve seat 7 when the plug is in a closed position.

The tubular opening 4 is provided with the threaded bearing collar 8, which is formed integral with the body. The plunger 5 is provided with the enlarged threaded portion 9 which works within the bearing collar 8. An extending lug 10 is formed upon the outer end of the plunger 5 and is adapted to receive a key for rotating the plunger. By use of a key in connection with the extending lug 10 the plunger 5 may be rotated to release the closure plug 6 from engagement with the valve seat 7 for allowing the liquid contents to flow freely from the receptacle and to be discharged through the discharge spout 11, which is formed integral with the body 1.

A sealing cap 12 which is provided with the removable sealing plug 13 is threaded upon the outer portion of the body for forming a closure for the outer portion of the tubular opening. It will be seen that by use of the square head 14 formed upon the sealing plug 13, the latter may be easily withdrawn so that the key seat on the part 9 may be employed to move the latter forward and back.

It will be seen that by use of the bearing collar 8 which is formed integral with the body 1 an efficient means has been produced for allowing the strain of the closing valve member to be taken up by the body portion. It will further be seen that by constructing the faucet so as to draw the closure plug upon the valve seat at the inner end of said faucet, the tubular opening 4 will be entirely emptied of the contents which have been passing from the receptacle and at the same time the pressure of the contents in the receptacle will act as a means for holding the closure plug in engagement with the valve seat independently of the plunger. A further object for placing the closure plug upon the inner end of the faucet is to allow the parts to be easily disassembled for facilitating the cleaning of the device.

When the device is in a closed position as illustrated in Fig. 1 the tubular body is entirely emptied, whereby any corrosion that would occur between the metal faucet and the liquid contents is prevented.

Having thus described the invention what is claimed as new, is:—

A faucet of the class described comprising a cylindrical body, said body provided on its inner end with a conical threaded portion, said body provided with a cylindrical opening extending entirely through the same, said opening reduced to form a bearing collar intermediate the two ends thereof, said bearing collar provided with a threaded portion, a plunger carried within said opening, a closure plug carried on the inner end of said plunger, said opening provided on its inner end with a flaring valve seat, said closure plug adapted to rest upon said valve seat for constituting a closure for said faucet, said plunger provided on its outer end with an enlarged threaded portion, said threaded portion positioned within said bearing collar, a key seat on said plunger formed adjacent said threaded portion and adapted to receive a key for rotating said plunger, whereby the closure plug may be lifted from said valve seat, a tubular discharge spout formed integral with said body portion between said bearing collar and the inner end of said opening, a sealing cap threaded on the outer end of said body portion, a removable plug carried by said sealing cap whereby, on removal of said plug, said key seat may be easily reached and the plunger reciprocated.

In testimony whereof we hereunto affix our signatures in presence of two witnesses.

JOHN EMRY BRANNON.
PETE MICHAEL.

Witnesses:
 BAREY H. GALLAGHER,
 JOHN JENKINS.

Copies of this patent may be obtained for five cents each, by addressing the "Commissioner of Patents, Washington, D. C."